(12) United States Patent
Iwamura et al.

(10) Patent No.: US 8,913,545 B2
(45) Date of Patent: Dec. 16, 2014

(54) MOBILE COMMUNICATION SYSTEM AND RADIO BASE STATION

(71) Applicant: NTT DoCoMo, Inc., Tokyo (JP)

(72) Inventors: Mikio Iwamura, Tokyo (JP); Hideaki Takahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/857,474

(22) Filed: Apr. 5, 2013

(65) Prior Publication Data

US 2013/0223327 A1 Aug. 29, 2013

Related U.S. Application Data

(62) Division of application No. 13/521,000, filed as application No. PCT/JP2011/050184 on Jan. 7, 2011.

(30) Foreign Application Priority Data

Jan. 8, 2010 (JP) .................................. 2010-003381

(51) Int. Cl.
| | | |
|---|---|---|
| *H04B 7/14* | (2006.01) | |
| *H04J 3/00* | (2006.01) | |
| *H04L 12/28* | (2006.01) | |
| *H04B 7/155* | (2006.01) | |
| *H04W 72/04* | (2009.01) | |
| *H04W 92/10* | (2009.01) | |
| *H04W 84/04* | (2009.01) | |

(52) U.S. Cl.
CPC .............. *H04W 72/042* (2013.01); *H04B 7/155* (2013.01); *H04W 92/10* (2013.01); *H04W 84/047* (2013.01)

USPC .............................. 370/315; 370/351; 370/464

(58) Field of Classification Search
USPC .......... 370/229, 235, 236, 241, 246, 273, 274, 370/276, 277, 279, 293, 310, 315, 351, 389
See application file for complete search history.

(56) References Cited

U.S. PATENT DOCUMENTS

| | | | |
|---|---|---|---|
| 2007/0010196 A1* | 1/2007 | Periyalwar et al. | ............... 455/7 |
| 2008/0032744 A1* | 2/2008 | Khan et al. | ................. 455/562.1 |
| 2010/0110942 A1 | 5/2010 | Cai et al. | |

FOREIGN PATENT DOCUMENTS

| | | |
|---|---|---|
| EP | 1 919 143 A2 | 5/2008 |
| JP | 2009 77289 A | 4/2009 |
| WO | 2007/053954 A1 | 5/2007 |

OTHER PUBLICATIONS

International Search Report w/translation from PCT/JP2011/050184 dated Mar. 15, 2011 (3 pages).
Texas Instruments; "On the design of relay node for LTE-advanced", 3GPP TSG RAN WG1 #56; R1-090593, Feb. 9-13, 2009 (11 pages).

(Continued)

*Primary Examiner* — Omar Ghowrwal
(74) *Attorney, Agent, or Firm* — Osha Liang LLP

(57) ABSTRACT

A mobile communication system according to the present invention is configured such that a relay node RN is configured to time-share a subframe for transmission and reception in a Un interface and a subframe for transmission and reception in a Uu interface, and a radio base station DeNB is configured to transmit SI, which is to be transmitted in a subordinate cell, to the relay node RN via individual signaling.

1 Claim, 6 Drawing Sheets

(56) References Cited

OTHER PUBLICATIONS

3GPP TS 36.321 V9.1.0; "3rd Generation Partnership Project; Technical Specification Group Radio Access Network; Evolved Universal Terrestrial Radio Access (E-UTRA) Medium Access Control (MAC) protocol specification (Release 9)", Dec. 2009 (48 pages).

3GPP TR 36.814 V1.5.0; "3rd Generation Partnership Project; Technical Specification Group Radio Access Network; Further Advancements for E-UTRA Physical Layer Aspects (Release 9)", Nov. 2009 (53 pages).

3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)", Mar. 2010 (34 pages).

Japanese Office Action w/translation from Japanese Application No. 2010-003381 mailed Mar. 15, 2011 (5 pages).

United States Office Action from corresponding U.S. Appl. No. 13/521,000 mailed Jun. 28, 2013 (18 pages).

Chinese Office Action for Chinese Application No. 20118000565 mailed Apr. 22, 2013, with English translation thereof (13 pages).

Extended European Search Report from European Application No. 11 73 1845, mailed May 13, 2013 (9 pages).

3GPP TSG-RAN WG2 #68bis; R2-100259, "System Information Change Notification in Relay Operation," NTT Docomo, Inc., Jan. 18-22, 2010, Valencia, Spain (2 pages).

3GPP TSG-RAN WG2 #67bis; R2-096484, "Relay Control Plane," Huawei, Nov. 9-13, 2009, Jeju, Korea (2 pages).

Office Action dated Oct. 14, 2013 in corresponding Chinese Patent Application No. 201180005650.X (with English translation)(16 pages).

Office Action dated Apr. 4, 2014 in corresponding Chinese Application No. 201180005650.X (with translation) (12 pages).

Office Action dated Apr. 14, 2014 in corresponding Canadian Application No. 2,786,643 (2 pages).

\* cited by examiner

MOBILE COMMUNICATION SYSTEM AND RADIO BASE STATION

CROSS-REFERENCE TO RELATED APPLICATIONS

The present application is a divisional application of, and, thereby, claims benefit under 35 U.S.C. §120 to U.S. patent application Ser. No. 13/521,000 filed on Jul. 6, 2012, which is a national stage application of PCT Application No. PCT/JP2011/050184, filed on Jan. 7, 2011, which claims priority to Japanese Patent Application No. 2010-003381 filed on Jan. 8, 2010. The content of these applications is incorporated by reference in their entirety.

TECHNICAL FIELD

The present invention relates to a mobile communication system and a radio base station.

BACKGROUND ART

In a mobile communication system employing an LTE (Long Term Evolution)-Advanced scheme for which the 3GPP is developing a specification, the application of "L3 Relay (Type 1 Relay)" using a relay node RN has been discussed.

However, in a conventional mobile communication system, in order to guarantee a "Backward compatibility" for a mobile station UE in a cell subordinate to a relay node RN (Relay Node), it is necessary for the relay node RN to time-share a subframe for transmission and reception in a Un interface and a subframe for transmission and reception in a Uu interface, by using an MBSFN (MBMS over a Single Frequency Network) subframe.

Therefore, it is possible for the relay node RN to receive a downlink signal from a radio base station DeNB (a Donor eNB) only in the MBSFN subframe. Thus, there is a problem that when broadcast information transmitted by the radio base station DeNB has been changed, it is not possible for the relay node RN to immediately receive the broadcast information.

SUMMARY OF THE INVENTION

Therefore, the present invention has been achieved in view of the above-described problems, and an object thereof is to provide a mobile communication system and a radio base station, by which it is possible for a relay node to reliably receive broadcast information transmitted by a radio base station.

A first characteristic of the present embodiment is summarized in that a mobile communication system, in which a radio base station and a relay node are connectable to each other via a first interface, and in which the relay node and a mobile station are connectable to each other via a second interface, in which the relay node is configured to time-share a period for transmission and reception in the first interface and a period for transmission and reception in the second interface, and the radio base station is configured to transmit broadcast information, which is to be transmitted in a subordinate cell, to the relay node via individual signaling.

A second characteristic of the present embodiment is summarized in that a radio base station in a mobile communication system, in which the radio base station and a relay node are connectable to each other via a first interface, and in which the relay node and a mobile station are connectable to each other via a second interface, comprising, a broadcast information transmission unit configured to transmit broadcast information in a subordinate cell, and an individual signaling unit configured to transmit the broadcast information to the relay node via individual signaling.

A third characteristic of the present embodiment is summarized in that a mobile communication system, in which a radio base station and a relay node are connectable to each other via a first interface, and in which the relay node and a mobile station are connectable to each other via a second interface, in which the relay node is configured to time-share a period for transmission and reception in the first interface and a period for transmission and reception in the second interface, and the radio base station is configured to transmit identification information for a mobile station and a first scheduling signal via a physical downlink control channel, and to transmit broadcast information via a broadcast channel designated by the first scheduling signal, and the radio base station is configured to transmit identification information for a relay node and a second scheduling signal via the physical downlink control channel, and to transmit the broadcast information via a broadcast channel designated by the second scheduling signal.

A fourth characteristic of the present embodiment is summarized in that a radio base station in a mobile communication system, in which the radio base station and a relay node are connectable to each other via a first interface, and in which the relay node and a mobile station are connectable to each other via a second interface, comprising, a mobile station-use broadcast information transmission unit configured to transmit identification information for a mobile station and a first scheduling signal via a physical downlink control channel, and to transmit broadcast information via a broadcast channel designated by the first scheduling signal, and a relay node-use broadcast information transmission unit configured to transmit identification information for a relay node and a second scheduling signal via the physical downlink control channel, and to transmit the broadcast information via a broadcast channel designated by the second scheduling signal.

A fifth characteristic of the present embodiment is summarized in that a mobile communication system, in which a radio base station and a relay node are connectable to each other via a first interface, and in which the relay node and a mobile station are connectable to each other via a second interface, in which the relay node is configured to time-share a period for transmission and reception in the first interface and a period for transmission and reception in the second interface, and the radio base station is configured to transmit a first scheduling signal via a physical downlink control channel, and to transmit broadcast information via a broadcast channel designated by the first scheduling signal, and the radio base station is configured to transmit a second scheduling signal via a physical downlink control channel dedicated to a relay node, and to transmit the broadcast information via a broadcast channel designated by the second scheduling signal.

A sixth characteristic of the present embodiment is summarized in that a radio base station in a mobile communication system, in which the radio base station and a relay node are connectable to each other via a first interface, and in which the relay node and a mobile station are connectable to each other via a second interface, comprising, a mobile station-use broadcast information transmission unit configured to transmit a first scheduling signal via a physical downlink control channel, and to transmit broadcast information via a broadcast channel designated by the first scheduling signal, and a relay node-use broadcast information transmission unit configured to transmit a second scheduling signal via a physical downlink control channel dedicated to a relay node, and to transmit the broadcast information via a broadcast channel designated by the second scheduling signal.

As described above, according to the present invention, it is possible to provide a mobile communication system and a radio base station, by which it is possible for a relay node to reliably receive broadcast information transmitted by a radio base station.

DESCRIPTION OF EMBODIMENTS (Mobile Communication System According to First Embodiment of the Present Invention)

Figure 1:
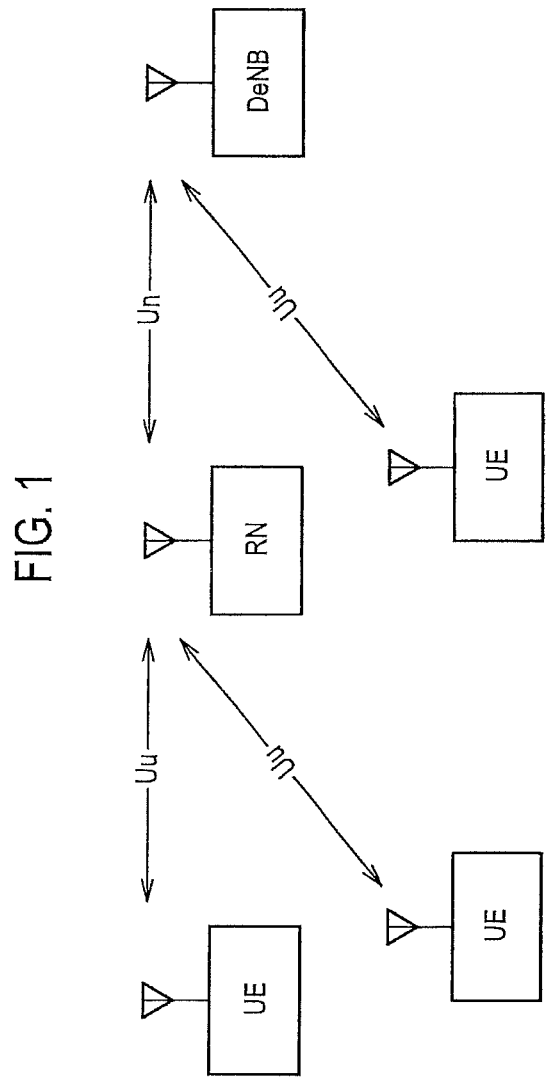
FIG. 1 is a diagram showing the entire configuration of a mobile communication system according to a first embodiment of the present invention.
Figure 2:
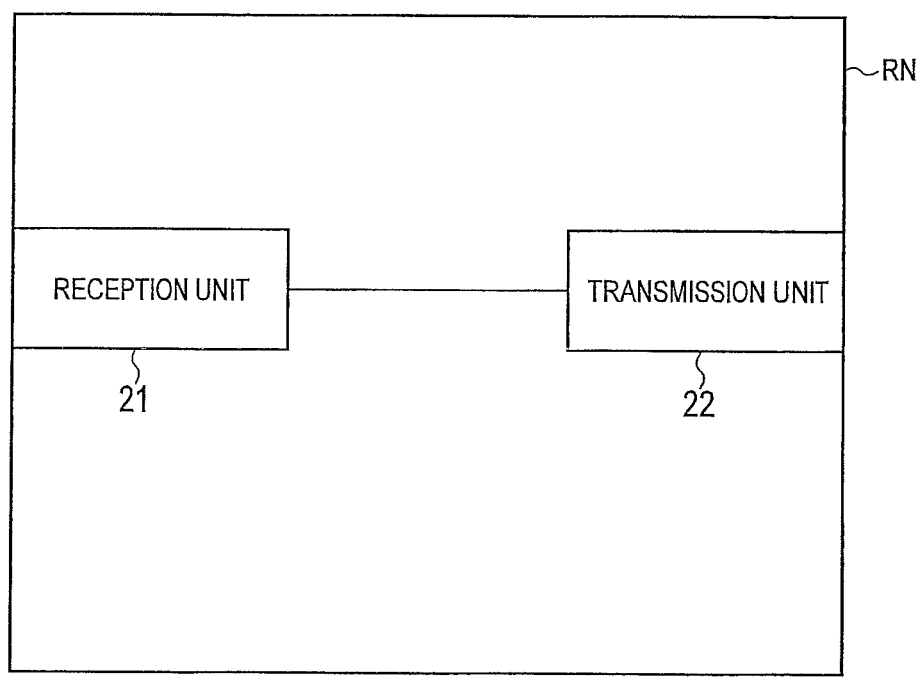
FIG. 2 is a functional block diagram of a relay node according to the first embodiment of the present invention.
Figure 3:
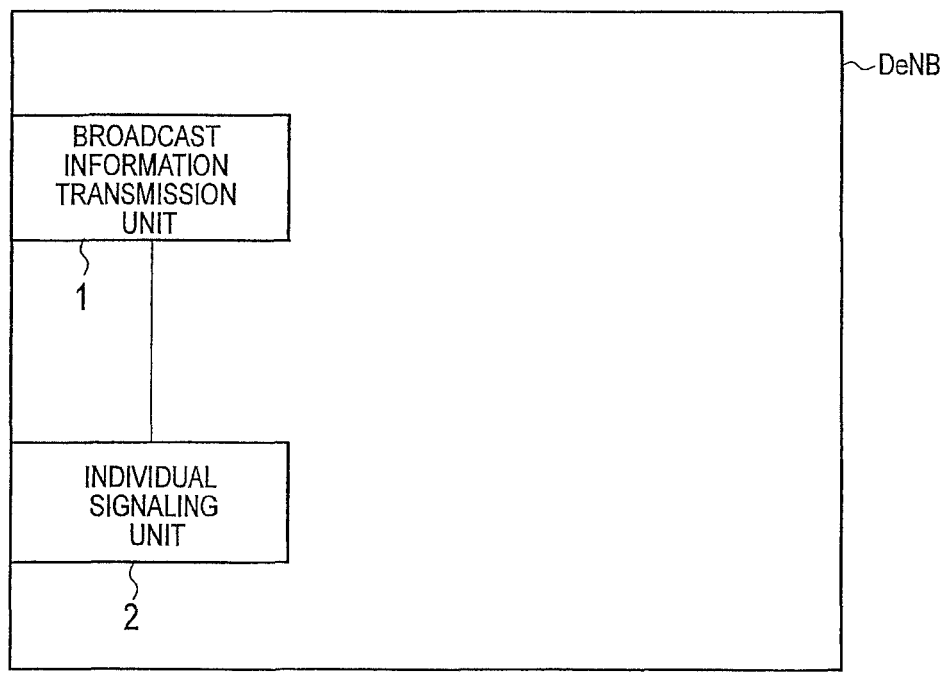
FIG. 3 is a functional block diagram of a radio base station according to the first embodiment of the present invention.

With reference to FIG. 1 to FIG. 3, a mobile communication system according to a first embodiment of the present invention will be described.

The mobile communication system according to the present embodiment is an LTE-Advanced mobile communication system, and includes a radio base station DeNB, a relay node RN, and a plurality of mobile stations UE as illustrated in FIG. 1.

The radio base station DeNB and the relay node RN are configured to be connected to each other through a Un interface, and the relay node RN and each mobile station UE are configured to be connected to each other through a Uu interface.

As illustrated in FIG. 2, the relay node RN includes a reception unit 21 and a transmission unit 22.

The reception unit 21 is configured to receive a signal from the radio base station DeNB in a subframe for reception in the Un interface, and a signal from the mobile station UE in a subframe for reception in the Uu interface.

In addition, as will be described later, the reception unit 21 is configured to receive SI (System Information), which is broadcast information transmitted in a cell subordinate to the radio base station DeNB, via individual signaling from the radio base station DeNB.

The transmission unit 22 is configured to transmit a signal to the radio base station DeNB in a subframe for transmission in the Un interface, and a signal to the mobile station UE in a subframe for transmission in the Uu interface.

In the mobile communication system according to the present embodiment, the relay node RN is configured to time-share a subframe for transmission and reception in the Un interface and a subframe for transmission and reception in the Uu interface.

That is, in the Uu interface, the relay node RN is configured to transmit a signal to the mobile station UE only in an MBSFN subframe.

As illustrated in FIG. 3, the radio base station DeNB includes a broadcast information transmission unit 1 and an individual signaling unit 2.

The broadcast information transmission unit 1 is configured to transmit SI (System Information) such as MIB (Master Information Block) or SIB (System Information Block) in a subordinate cell.

Specifically, the broadcast information transmission unit 1 is configured to transmit BCCH (Broadcast Control Channel)-RNTI (Radio Network Temporary Identity) and a scheduling signal via PDCCH (Physical Downlink Control Channel), and to transmit the SI via BCCH transmitted by PDSCH (Physical Downlink Shared Channel) designated by the scheduling signal.

The individual signaling unit 2 is configured to transmit the SI to the relay node RN via individual signaling.

Specifically, it is configured to transmit C-RNTI (may also be called RN-RNTI because it is for the relay node RN) individually assigned to the relay node RN and a scheduling signal via the PDCCH or RPDCCH which will be described later, and to transmit the SI via DCCH (Dedicated Control Channel: individual control channel) transmitted by PDSCH designated by the scheduling signal.

In accordance with the mobile communication system according to the first embodiment of the present invention, even when there are a plurality of relay nodes RN in which timings of MBSFN subframes are different from one another, it is possible to reliably transmit the SI to each of the relay nodes RN via individual signaling.

(Mobile Communication System According to Second Embodiment of the Present Invention)

Figure 4:
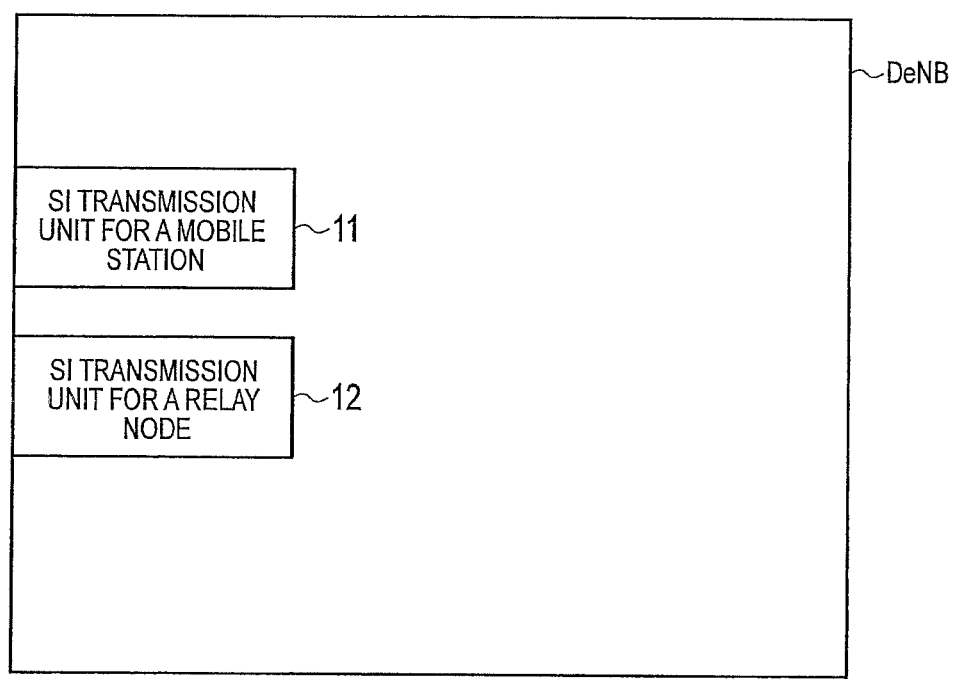
FIG. 4 is a functional block diagram of a radio base station according to a second embodiment of the present invention.
Figure 5:
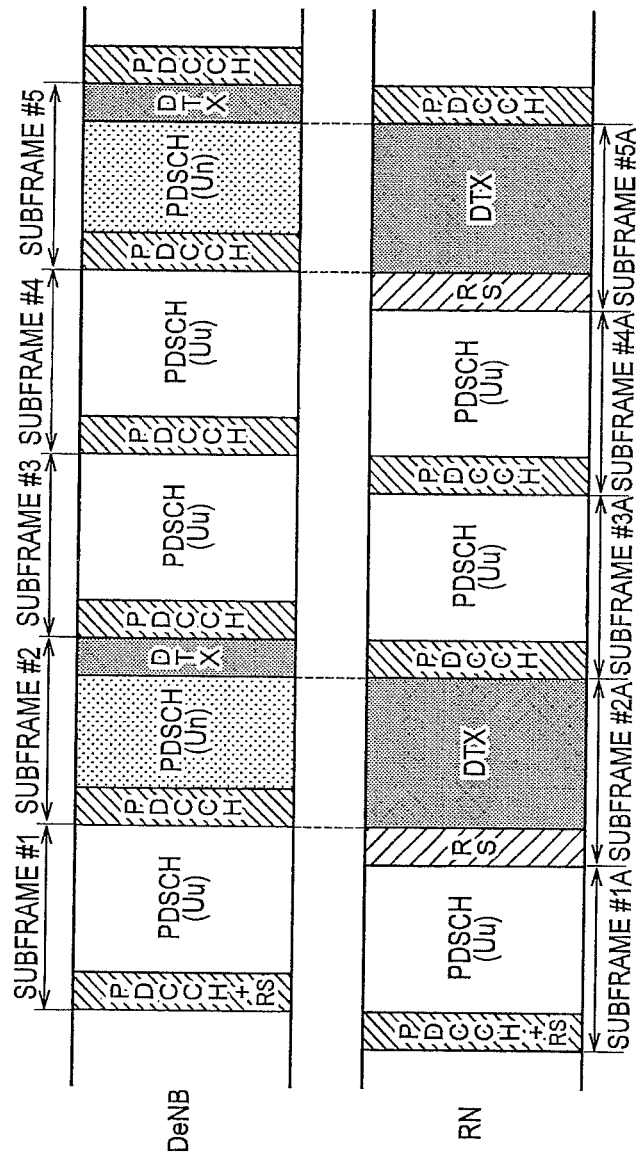
FIG. 5 is a diagram explaining an adjustment method of a transmission timing of an uplink signal by a mobile station according to the second embodiment of the present invention.

With reference to FIG. 1, FIG. 4, and FIG. 5, the mobile communication system according to a second embodiment of the present invention will be described. Hereinafter, the following is a description of the mobile communication system according to the second embodiment of the present invention while focusing on the difference from the above-described mobile communication system according to the first embodiment of the present invention.

As illustrated in FIG. 4, the radio base station DeNB includes a mobile station-use SI transmission unit 11 and a relay node-use SI transmission unit 12.

The mobile station-use SI transmission unit 11 is configured to transmit BCCH-RNTI and a scheduling signal via the PDCCH, and to transmit SI via BCCH transmitted by PDSCH designated by the scheduling signal.

FIG. 5 illustrates timings of subframes for transmission in the radio base station DeNB and timings of subframes for transmission in the relay node RN.

In the mobile communication system according to the present embodiment, as illustrated in FIG. 5, the timings of the subframes for transmission in the radio base station DeNB are shifted from the timings of the subframes for transmission in the relay node RN by a predetermined number of (for example, one) symbols.

Here, the mobile station-use SI transmission unit 11, for example, is configured to transmit the BCCH-RNTI and the scheduling signal via the PDCCH in subframes #1, #3, and #4, and to transmit the SI via the BCCH mapped to the PDSCH (Physical Downlink Shared Channel) designated by the scheduling signal.

The relay node-use SI transmission unit 12 is configured to transmit RN-specific-BCCH-RNTI and a scheduling signal via the PDCCH, and to transmit the SI via BCCH mapped to PDSCH designated by the scheduling signal.

Here, the relay node-use SI transmission unit 12, for example, is configured to transmit the RN-specific-BCCH- RNTI and the scheduling signal via the PDCCH in a subframe #2 corresponding to a period (DTX) in which a signal is not transmitted in the relay node RN, and to transmit the SI via the BCCH mapped to the PDSCH designated by the scheduling signal.

Furthermore, the relay node-use SI transmission unit 12 may be configured to repeatedly transmit the aforementioned SI, periodically. Here, the relay node-use SI transmission unit 12 may be configured to repeatedly transmit the SI by a sufficient number of times in consideration of the timing of an MBSFN subframe in each relay node RN, so that the SI is received in all relay nodes RN.

Moreover, the relay node-use SI transmission unit 12 may be configured to transmit the SI, in addition to when the SI has been changed, by using the aforementioned method.

In addition, as illustrated in FIG. 5, the mobile station-use SI transmission unit 11 is configured to transmit RS (Reference Signal) together with a PDCCH signal at one symbol of a head of a subframe #1.

Similarly, the relay node-use SI transmission unit 12 is configured to transmit the RS together with the PDCCH signal at one symbol of a head of a subframe #1A.

In accordance with the mobile communication system according to the second embodiment of the present invention, it is possible for the mobile station UE to receive the SI using the BCCH-RNTI, and it is possible for the relay node RN to receive the SI using the RN-specific-BCCH-RNTI as before.

Consequently, it is possible for the radio base station DeNB to transmit the SI to a plurality of relay nodes RN without using individual signaling.

(First Modification)

Figure 6:
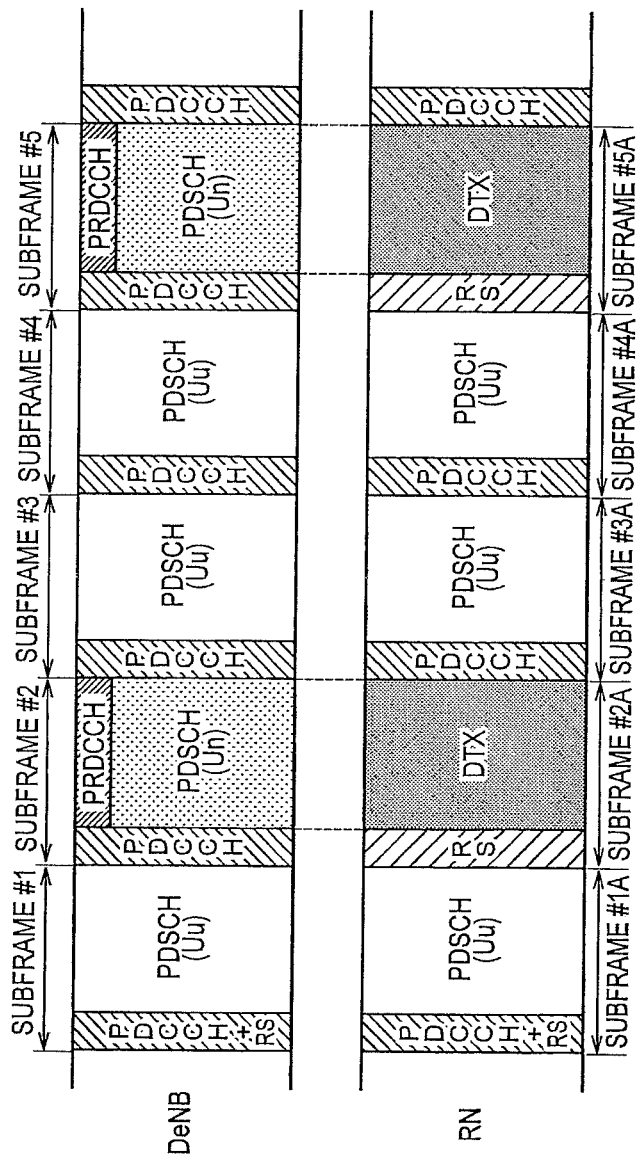
FIG. 6 is a diagram explaining an adjustment method of transmission timing of an uplink signal by the mobile station according to the second embodiment of the present invention.

With reference to FIG. 6, a first modification of the mobile communication system according to the second embodiment of the present invention will be described. Hereinafter, the following is a description of the mobile communication system according to the present first modification while focusing on the difference from the above-described mobile communication system according to the second embodiment of the present invention.

In the mobile communication system according to the present first modification, as illustrated in FIG. 6, the timings of the subframes for transmission in the radio base station DeNB coincide with the timings of the subframes for transmission in the relay node RN.

Furthermore, in the radio base station DeNB according to the present first modification, similarly to in the radio base station DeNB according to the second embodiment of the present invention, the mobile station-use SI transmission unit 11 is configured to transmit BCCH-RNTI and a scheduling signal via the PDCCH, and to transmit SI via BCCH mapped to PDSCH designated by the scheduling signal.

Here, the mobile station-use SI transmission unit 11, for example, is configured to transmit the BCCH-RNTI and the scheduling signal via the PDCCH in subframes #1, #3, and #4, and to transmit the SI via the BCCH mapped to the PDSCH designated by the scheduling signal.

Furthermore, in the radio base station DeNB according to the present first modification, the relay node-use SI transmission unit 12 is configured to transmit a scheduling signal via the RPDCCH (RN-specific-PDCCH), and to transmit the SI via BCCH mapped to PDSCH designated by the scheduling signal.

The RPDCCH is PDCCH for the relay node RN and is a channel for performing scheduling for the relay node RN. An RPDCCH signal is not received in the mobile station UE.

Here, the relay node-use SI transmission unit 12, for example, is configured to transmit the BCCH-RNTI (or the RN-specific-BCCH-RNTI) and the scheduling signal via the RPDCCH in a subframe #2 corresponding to a period (DTX) in which a signal is not transmitted in the relay node RN, and to transmit the SI via the BCCH mapped to the PDSCH designated by the scheduling signal.

In addition, as illustrated in FIG. 6, a resource for the RPDCCH is configured to be mapped to a symbol period equal to that of a resource for the PDSCH in the subframe #2.

In addition, in the above embodiments, the relay node-use SI transmission unit 12 may be configured to transmit only partial SI including only a parameter in which a change has occurred.

The characteristics of the present embodiment as described above may be expressed as follows.

A first characteristic of the present embodiment is summarized in a mobile communication system, in which a radio base station DeNB and a relay node RN are connectable to each other via a Un interface (a first interface), and in which the relay node RN and a mobile station UE are connectable to each other via a Uu interface (a second interface), the relay node RN is configured to time-share a subframe (a period) for transmission and reception in the Un interface and a subframe for transmission and reception in the Uu interface, and the radio base station DeNB is configured to transmit SI (broadcast information), which is to be transmitted in a subordinate cell, to the relay node RN via individual signaling.

A second characteristic of the present embodiment is summarized in a radio base station DeNB in a mobile communication system, in which the radio base station DeNB and a relay node RN are connectable to each other via a Un interface, and in which the relay node RN and a mobile station UE are connectable to each other via a Uu interface, which includes: a broadcast information transmission unit 1 configured to transmit SI in a subordinate cell, and an individual signaling unit 2 configured to transmit the SI to the relay node RN via individual signaling.

A third characteristic of the present embodiment is summarized in a mobile communication system, in which a radio base station DeNB and a relay node RN are connectable to each other via a Un interface, and in which the relay node RN and a mobile station UE are connectable to each other via a Uu interface, the relay node RN is configured to time-share a subframe for transmission and reception in the Un interface and a subframe for transmission and reception in the Uu interface, and the radio base station DeNB is configured to transmit BCCH-RNTI (identification information for a mobile station) and a first scheduling signal via PDCCH (Physical Downlink Control Channel), to transmit SI (broadcast information) via BCCH (a broadcast channel) designated by the first scheduling signal, to transmit RN-specific-BCCH-RNTI (identification information for a relay node) and a second scheduling signal via the PDCCH, and to transmit the SI via BCCH designated by the second scheduling signal.

A fourth characteristic of the present embodiment is summarized in a radio base station DeNB in a mobile communication system, in which the radio base station DeNB and a relay node RN are connectable to each other via a Un interface, and in which the relay node RN and a mobile station UE are connectable to each other via a Uu interface, which includes: a mobile station-use SI transmission unit 11 configured to transmit BCCH-RNTI and a first scheduling signal via PDCCH, and to transmit SI via BCCH designated by the first scheduling signal; and a relay node-use SI transmission unit 12 configured to transmit RN-specific-BCCH-RNTI and a second scheduling signal via the PDCCH, and to transmit the SI via BCCH designated by the second scheduling signal.

A fifth characteristic of the present embodiment is summarized in that in a mobile communication system, in which a radio base station DeNB and a relay node RN are connectable to each other via a Un interface, and in which the relay node RN and a mobile station UE are connectable to each other via a Uu interface, the relay node RN is configured to time-share a subframe for transmission and reception in the Un interface and a subframe for transmission and reception in the Uu interface, and the radio base station DeNB is configured to transmit a first scheduling signal via PDCCH, to transmit SI via BCCH designated by the first scheduling signal, to transmit a second scheduling signal via RPDCCH (Physical Downlink Control Channel dedicated to a relay node), and to transmit the SI via BCCH designated by the second scheduling signal.

A sixth characteristic of the present embodiment is summarized in that a radio base station DeNB in a mobile communication system, in which the radio base station DeNB and a relay node RN are connectable to each other via a Un interface, and in which the relay node RN and a mobile station UE are connectable to each other via a Uu interface, includes: a mobile station-use SI transmission unit 11 configured to transmit a first scheduling signal via PDCCH, and to transmit SI via BCCH designated by the first scheduling signal; and a relay node-use SI transmission unit 12 configured to transmit a second scheduling signal via RPDCCH, and to transmit the SI via BCCH designated by the second scheduling signal.

It is noted that the operation of the above-described the mobile station UE, the radio base station DeNB or the relay node RN may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station UE, the radio base station DeNB or the relay node RN. Further, such a storage medium or a processor may be arranged, as a discrete component, in the mobile station UE, the radio base station DeNB or the relay node RN.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication system and a radio base station, by which it is possible for a relay node to reliably receive broadcast information transmitted by a radio base station.

REFERENCE SIGNS LIST

DeNB . . . radio base station
1 . . . broadcast information transmission unit
2 . . . individual signaling unit
11 . . . mobile station-use SI transmission unit
12 . . . relay node-use SI transmission unit
RN . . . relay node
21 . . . reception unit
22 . . . transmission unit

The invention claimed is:
1. A radio base station in a mobile communication system, in which the radio base station and a relay node are connected to each other via a Un interface, and in which the relay node and a mobile station are connected to each other via a Uu interface, the radio base station comprising:
  a broadcast information transmission unit configured to transmit system information in a subordinate cell, the system information comprising BCCH (Broadcast Control Channel)-RNTI (Radio Network Temporary Identity) and a scheduling signal via PDCCH (Physical Downlink Control Channel), and
  an individual signaling unit configured to transmit the system information comprising the RNTI individually assigned to the relay node RN and the scheduling signal via the PDCCH to the relay node via individual signaling.

* * * * *